United States Patent
Allen

(10) Patent No.: US 6,299,847 B1
(45) Date of Patent: Oct. 9, 2001

(54) AMMONIA CATALYTIC ABATEMENT APPARATUS AND METHOD

(75) Inventor: Cary P. Allen, Farmington Hills, MI (US)

(73) Assignee: Durr Environmental, Wixom, MI (US)

( * ) Notice: Subject to any disclaimer, the term of this patent is extended or adjusted under 35 U.S.C. 154(b) by 0 days.

(21) Appl. No.: 09/342,691

(22) Filed: Jun. 29, 1999

Related U.S. Application Data

(60) Provisional application No. 60/091,918, filed on Jul. 7, 1998.

(51) Int. Cl.[7] .................................. C01C 1/12; B01J 8/02; C01B 21/20
(52) U.S. Cl. ........................................ 423/237; 423/239.1
(58) Field of Search ................... 423/237, 239.1

(56) References Cited

U.S. PATENT DOCUMENTS

| | | | |
|---|---|---|---|
| 4,138,469 | * 2/1979 | Kato et al. | 423/239 |
| 4,179,407 | * 12/1979 | Iiyama et al. | 252/446 |
| 4,438,082 | * 3/1984 | Dettling et al. | 423/235 |
| 5,534,236 | * 7/1996 | Woldhuis | 423/237 |
| 5,679,313 | * 10/1997 | Nojima et al. | 423/237 |
| 5,728,356 | * 3/1998 | Iida et al. | 423/239.1 |

* cited by examiner

*Primary Examiner*—Steven P. Griffin
*Assistant Examiner*—Maribel Medina
(74) *Attorney, Agent, or Firm*—Howard & Howard

(57) ABSTRACT

An ammonia catalytic abatement apparatus and method having two types of catalytic converters in line, wherein the first catalytic converter preferably including platinum as the catalytic agent converts or reduces the ammonia in an ammonia laden gas stream to $N_2$, $H_2O$ and approximately equal stoichiometric proportions of $NO_x$ and the remaining unconverted $NH_3$. The second catalytic converter which preferably is a selective catalytic reduction (SCR) catalyst then converts substantially all of the $NO_x + NH_3$ to $N_2 + H_2O$ vapor. The ammonia laden gas stream is first heated to the reaction temperatures of the catalytic converters which in the disclosed embodiment is about 300° C. The disclosed apparatus further includes a recuperative heat exchanger which preheats the gas prior to the heating element.

10 Claims, 1 Drawing Sheet

AMMONIA CATALYTIC ABATEMENT APPARATUS AND METHOD

This application claims the benefit of U.S. Provisional Application No. 60/091,918, filed Jul. 7, 1998.

BACKGROUND OF THE INVENTION

Ammonia abatement is a particular problem in the treatment of human and animal waste, sludge, manure decomposition and fertilizer manufacturing facilities. At present, ammonia gas is generally abated with a wet scrubbing system which is relatively expensive and requires secondary treatment of the wastewater. Combustion catalytic converters are also known for abatement of ammonia gas. However, the effluent from such catalytic converters include unacceptable levels of oxides of nitrogen (NOx) in many applications.

The ammonia catalytic abatement apparatus and method of this invention solves this problem on a dry basis, such that there is no wastewater associated with abating the ammonia laden gas, and it is less expensive and easier to operate while achieving equal or better results than wet scrubbers.

SUMMARY OF THE INVENTION

The ammonia catalytic abatement apparatus and method of this invention utilizes two types of catalytic converters in line, wherein the first catalytic converter converts the ammonia in an ammonia laden gas stream to nitrogen in approximately equal stoichiometric proportions of oxides of nitrogen and the remaining unconverted ammonia gas. The second catalytic converter then converts substantially all the remaining ammonia gas and oxides of nitrogen into nitrogen and water vapor, thus achieving greater conversion of the ammonia to nitrogen while minimizing oxides of nitrogen in the effluent vented to atmosphere. The ammonia laden gas stream is first heated to the required conversion temperature of the first catalytic converter, which is generally about 300° C. or greater. The first catalytic converter in the disclosed embodiment includes platinum as the catalytic agent, which converts approximately 80% of the ammonia to nitrogen gas and about 10% of the ammonia to oxides of nitrogen. The gas stream leaving the first catalytic converter thus includes approximately equal stoichiometric proportions of oxides of nitrogen and ammonia which, in the disclosed embodiment of the first catalytic converter, is about 10% each. The gas stream can now be treated with a second selective catalytic reduction catalyst, wherein substantially all of the oxides of nitrogen and remaining ammonia gas can be converted to nitrogen and water vapor by the following equation:

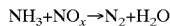

$$NH_3 + NO_x \rightarrow N_2 + H_2O$$

The disclosed preferred embodiment of the apparatus for abating ammonia gas in an ammonia laden gas stream while minimizing oxides of nitrogen in the effluent entering the atmosphere thus includes a heater which receives the ammonia laden gas and which heats the gas to the conversion temperature of the first catalytic converter, a first catalytic converter which converts the ammonia gas to nitrogen, water vapor and approximately equal stoichiometric proportions of oxides of nitrogen (NOx) and the remaining ammonia ($NH_3$) gas, and a second catalytic converter which receives this gas stream and which converts substantially all of the remaining $NH_3$ and NOx. In the disclosed embodiment, ammonia laden gas, typically air, is conveyed by a fan through a recuperative heat exchanger, where the air is preheated. A heater, such as a natural gas burner, then heats the gas stream to approximately 300° C. or greater. The gas stream is then passed through the first catalytic converter, wherein approximately 80% of the $NH_3$ is converted to $N_2+H_2O$ and about 10% NOx, leaving about 10% unreacted $NH_3$. The second selective catalytic reduction catalyst then converts substantially all of the remaining $NH_3$ and NOx to $N_2$ and $H_2O$, as described above. Finally, the gas stream is returned to the regenerative heat exchanger prior to exiting the system to atmosphere.

The method of abating ammonia gas in an ammonia laden air or gas stream while minimizing oxides of nitrogen in the effluent entering atmosphere of this invention thus includes heating the ammonia laden gas stream to the reaction temperature of the first catalytic converter, then converting the ammonia gas in the heated ammonia laden gas stream to nitrogen, water vapor and approximately equal proportions of the remaining unreacted ammonia gas and oxides of nitrogen, then converting substantially all of the remaining ammonia gas and oxides of nitrogen to nitrogen and water vapor. As set forth above, the ammonia gas is preferably converted in a catalytic converter, wherein the first catalytic converter includes platinum as the catalytic agent and the second catalytic converter is preferably is a selective catalytic reagent catalyst generally including base metal oxides as the catalytic agents such as titanium dioxide, vanadium pentoxide and tungsten trioxide. Typical catalytic converters of these types are comprised of a monolithic ceramic block substrate having numerous holes or cells through which the gas stream passes. The first catalytic converter preferably has about two hundred cells per square inch and the catalytic agent, preferably platinum, is calcined onto the ceramic. The second catalytic converter, which is preferably a selective catalytic reduction (SCR) catalyst, may also have a monolithic ceramic substrate structure having about one hundred cells per square inch, preferably calcined with base metal oxides including titanium dioxide, vanadium pentoxide and tungsten trioxide. An alternative embodiment includes an optional bypass around the first catalytic converter which receives heated ammonia laden gas from the heater and directs the heated ammonia laden gas to the second catalytic converter to compensate for excess oxides of nitrogen received from the first catalytic converter. The preferred embodiment includes a mixer which mixes the diverted heated ammonia laden gas received from the bypass and the effluent from the first catalytic converter to achieve approximately equal proportions of ammonia and oxides of nitrogen.

The ammonia catalytic abatement apparatus and method of this invention thus converts the ammonia gas in an ammonia laden gas or air stream while minimizing oxides of nitrogen in the effluent entering the atmosphere without requiring a wet scrubber and there is no wastewater associated with the process which must be further treated. The dry method and apparatus of this invention is approximately as effective as a wet scrubbing system and is less expensive and easier to operate while achieving equal or better results. Other advantages and meritorious features of the ammonia catalytic abatement apparatus and method of this invention will be more fully understood from the description of the preferred embodiments, the appended claims and the drawing, a brief description of which follows.

DETAILED DESCRIPTION OF THE PREFERRED EMBODIMENTS

Figure 1:
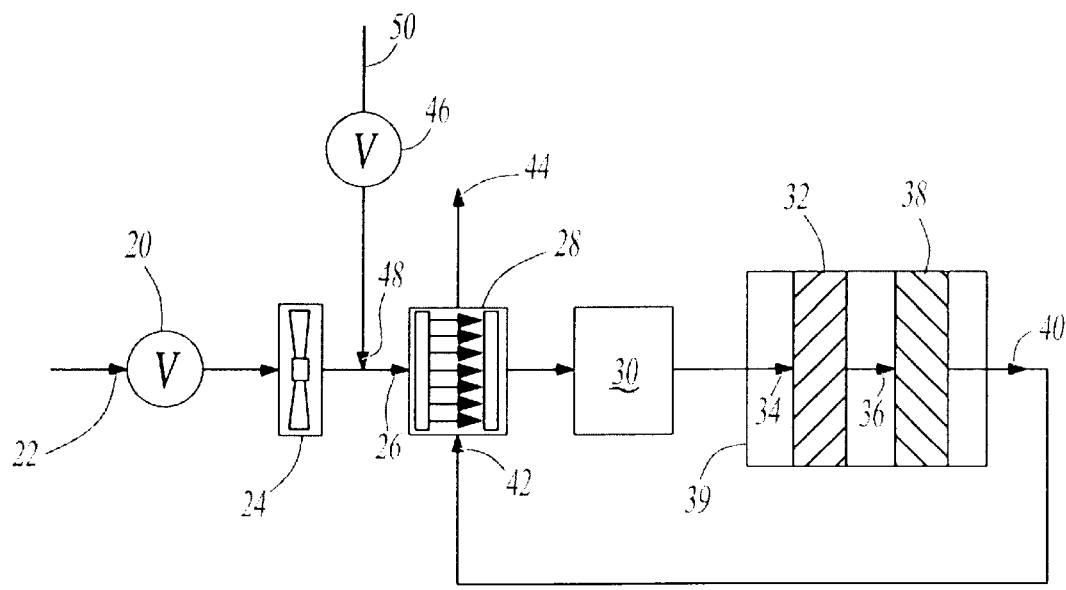
FIG. 1 is a schematic flow diagram illustrating one embodiment of the ammonia catalytic abatement apparatus and method of this invention.

As set forth above, the ammonia catalytic abatement apparatus and method of this invention may be used to treat ammonia laden gas or air produced, for example, by decomposition of human or animal waste, sludge treatment plants, fertilizer plants and the like. Ammonia laden gas is presently treated by wet scrubbing which requires subsequent treatment of the wastewater. In the embodiment of the ammonia catalytic abatement apparatus shown in FIG. 1, ammonia laden air or gas is first received by the system isolation valve 20 as shown by arrow 22. In a typical application, the concentration of ammonia in the gas stream may include 1,500 to 6,000 parts per million (PPM). As will be understood, the temperature of the incoming gas stream will depend upon the particular application. However, in a typical manure fermentation plant, for example, the temperature of the incoming stream will be about 55° C. The purpose of the system isolation valve 20 is simply to control the flow of the ammonia laden air to the system.

The ammonia laden air is conveyed to the apparatus by a conventional fan 24 such that the flow rate of the gas stream through the system is about 14,000 m³/hr. As will be understood, the flow rate will also depend upon the particular application. In the disclosed embodiment of the ammonia catalytic abatement apparatus of this invention, the ammonia laden air is then initially preheated in a conventional recuperative heat exchanger 28 as shown by arrow 26. The temperature to which the ammonia laden air or gas is preheated will also depend upon the operating parameters of the apparatus. However, in the disclosed embodiment, the ammonia laden gas is preheated from about 55° C. to approximately 235° C. A conventional recuperative heat exchanger may be used, such as a conventional manifold-type heat exchanger. The ammonia laden gas or air stream is then further heated by heater 30 to the required reaction temperature of the first catalytic converter 32, which in the disclosed embodiment is about 300° C. Any conventional heating element may be utilized including, for example, a natural gas or other combustion heating element.

The heated ammonia laden air or gas stream then enters the first catalytic converter 32 as shown by arrow 34. The first catalytic converter 32 is specifically adapted to convert the majority of the ammonia gas to nitrogen plus water vapor. However, catalytic converters are not presently available which will reduce all of the ammonia gas to nitrogen and water vapor. Further, conventional precious metal catalytic converters produce oxides of nitrogen (NOx) to an extent which is unacceptable environmentally in many applications. Thus, the first catalytic converter reduces the ammonia gas in the ammonia laden air stream by the following equation:

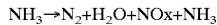

In a typical application using an efficient catalytic converter 32 having platinum as the catalytic agent, about 80% of the ammonia ($NH_3$) is reduced to $N_2+H_2O$. The resultant gas stream shown by arrow 36 further includes about 10% oxides of nitrogen and 10% unreacted ammonia. All of the percentages herein are in volume percent. It is important, however, to note that the stoichiometric proportions of NOx and remaining $NH_3$ in the gas stream 36 are thus approximately equal because commercially available selective catalytic reduction (SCR) catalysts are available which can then further reduce the oxides of nitrogen and the remaining ammonia to acceptable levels.

The gas stream then enters the second SCR catalyst 38 as shown by arrow 36, where in the oxides of nitrogen and the remaining ammonia gas in approximately equal stoichiometric proportions are further reduced by the following equation:

The gas stream leaving the second catalytic converter 38 as shown by arrow 40 is further heated by the catalytic converters 32 and 38 to a temperature of approximately 330° C. and recirculated to the recuperative heat exchanger 28 as shown by arrow 42 where the incoming ammonia laden gas is preheated as described above. Finally, the ammonia and oxides of nitrogen abated air is vented to the atmosphere in this embodiment of the apparatus at a temperature of about 150° C. as shown by arrow 44. The disclosed embodiment further includes a fresh air inlet through line 50, wherein fresh air may be received into the ammonia laden air stream as shown by arrow 48 through valve 46. As will be understood by those skilled in the art, atmospheric air may be used during startup and possibly for dilution of the ammonia laden gas stream, depending upon the concentration of the ammonia in the incoming gas stream. The catalytic converters 32 and 38 may be enclosed in separate sealed housings (not shown) or a single sealed housing 39 as shown which seals the communication between the converters.

As set forth above, the first catalyst or catalytic reactor 32 preferably includes a noble or precious metal, particularly platinum, as the catalytic agent. A suitable catalyst having platinum as the catalytic agent is available from Engelhard Corporation of Iselin, N.J. under the trade name NOxCat™ LoSlip™. The second catalyst or catalytic reactor 38 is preferably a SCR catalyst which is available from various sources. However, a suitable SCR catalyst is also available from Engelhard Corporation under the trade name NOx-CAT™ VNX™, Catalyst Series 200. Both of these catalysts are available in the form of a monolithic ceramic substrate having numerous cells, wherein the catalytic agent is calcined onto the ceramic. The LoSlip™ catalyst of Engelhard Corporation includes about 200 cells per square inch and platinum is the catalytic agent. The VNX™ catalyst of Engelhard Corporation includes about 100 cells per square inch and includes titanium dioxide as the primary catalytic agent with vinadium pentoxide and tungsten trioxide. It is believed, however, that various catalysts within the definitions provided above would be suitable for the apparatus and method of this invention.

As will be understood from the above disclosure, an object of this invention is to provide approximately equal stoichiometric proportions of oxides of nitrogen and ammonia to the second catalytic converter 38, such that the second catalytic converter will convert substantially all of the remaining ammonia in the gas stream and the oxides of nitrogen to nitrogen gas and water vapor according to the equation on page 7. In certain applications, however, the proportion of NOx may be greater than the ammonia gas in the gas stream 36, such as where the first catalytic converter 32 produces an excess of NOx or where the original gas stream 22 includes NOx. It is therefore desirable in some applications to increase the proportion of ammonia gas ($NH_3$) in the gas stream 36 entering the second catalytic converter 38 to more closely balance the stoichiometric proportions of $NH_3$ and NOx which can be accomplished in the second embodiment of the apparatus and method of this invention shown in FIG. 2.

Figure 2:
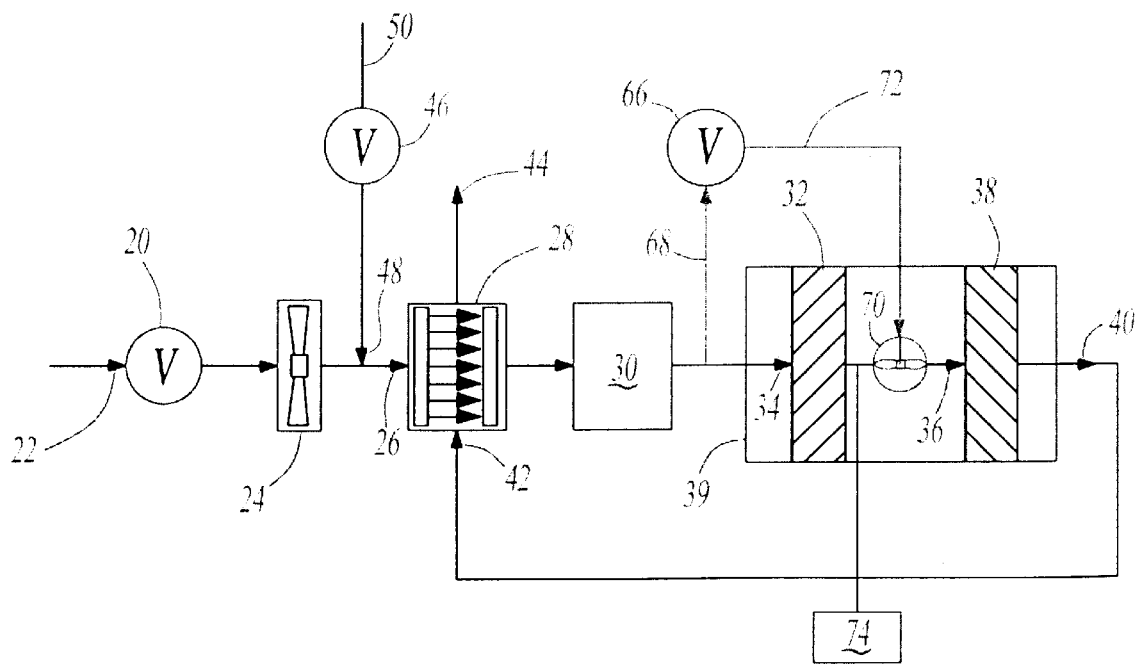
FIG. 2 is a schematic flow diagram of an alternative embodiment of the ammonia catalytic abatement apparatus and method of this invention.

The apparatus shown in FIG. 2 includes a bypass line 68 which receives heated ammonia laden gas or air from the heater 30 and a valve 66 which controls the volume of ammonia laden gas received by bypass line 68. The heated ammonia laden gas received in bypass 68 is then directed to mixer 70 through line 72. The mixer 70 can, for example, be a static mixer, a distribution grid or manifold (either internal to the blind or duct or external, or a long duct run or other suitable mixers.) The ammonia laden gas received through bypass line 68 and 72 is then mixed with the gas received from the first catalytic converter 32 in mixer 70, such that the $NH_3$ and NOx in the gas received by the second catalytic converter 38 as shown by arrow 36 is approximately stoichiometrically equal. Thus, as set forth above, the second catalytic converter 38 is able to convert substantially all of the NOx and $NH_3$ to nitrogen gas and water vapor. As will be understood by those skilled in the art, an abatement apparatus of this type is generally designed to the user's specifications which will include the concentration of ammonia in the ammonia laden gas and the designer will select the catalytic converters 32 and 38 based upon their specifications. However, in some applications, the ammonia received by line 22 may vary and the gas received by the apparatus may also include oxides of nitrogen. Thus, it may be desirable to adjust the proportion of heated ammonia laden gas received by bypass lines 68 and 72 during operation of the apparatus. Thus, the apparatus shown in FIG. 2 includes a conventional NOx analyzer 74 which continuously measures the oxides of nitrogen in the gas stream leaving the first catalytic converter 32 permitting continuous or periodic adjustment of the valve 66 to achieve approximately equal stoichiometric proportions of $NH_3$ and NOx received by the second catalytic converter 38 as shown by arrow 36 from the mixer 70.

The remaining components of the apparatus for abating ammonia gas in an ammonia laden gas stream shown in FIG. 2 may be identical to the apparatus disclosed in FIG. 1 and described above. The common components of the apparatus shown in FIG. 2 are therefore the same as FIG. 1. Further, the method of this invention utilizing the apparatus of FIG. 2 may also be identical to the method described above in regard to FIG. 1, except that the method of this embodiment includes diverting a portion of the heated ammonia laden gas stream received from heater 30 to the second catalytic converter 38 to achieve approximately equal stoichiometric proportions of oxides of nitrogen generated by the first catalytic converter 32 and the ammonia gas remaining in the gas stream. The preferred method of this alternative embodiment of the invention also includes mixing the gas stream received from the first catalytic converter 32 and the diverted ammonia laden gas received through bypass lines 68 and 72 prior to directing the gas stream to the second catalytic converter 38. Finally, the method of this invention may include monitoring the NOx received from the first catalytic converter 32 preferably by an NOx analyzer 74 and adjusting the volume of diverted heated ammonia laden gas such as by valve 66, such that the gas received by the second catalytic converter 38 has approximately equal stoichiometric proportions of NOx and $NH_3$. It is anticipated that the amount of ammonia gas diverted through bypass lines 68 and 72 will be relatively small in relation to the total volume of heated ammonia laden gas, generally less than twenty percent (20%) or more preferably less than ten percent (10%) by volume.

As will now be understood, the ammonia catalytic abatement apparatus and method of this invention is a dry ammonia abatement system which therefor avoids the problems associated with wet scrubbing systems and is less expensive and easier to operate while achieving equal or better results. In a typical application, the apparatus of this invention may be utilized to abate the ammonia gas in an ammonia laden air stream containing 1,500 to 6,000 PPM, wherein the stream vented to atmosphere as indicated by arrow 44 includes less than 250 PPM of NOx and less than 50 PPM of ammonia. As will be understood by those skilled in the art, various modifications may be made to the ammonia catalytic abatement apparatus and method of this invention within the purview of the appended claims. For example, various heaters may be used to heat the incoming ammonia laden air stream provided the gas stream is heated to the required reaction temperature of the catalytic converters. Thus, although heating is important, the temperature will depend upon the catalytic converters utilized. Further, the fresh air inlet through line 50 may be utilized to adjust the concentration of the ammonia in the inlet stream, although dilution will not be required in most applications. Having described the invention, the invention is now claimed as set forth below.

What is claimed is:

1. A method of abating ammonia gas in an ammonia laden gas stream while minimizing oxides of nitrogen in the effluent entering the atmosphere, comprising the following steps:

heating said ammonia laden gas stream;

first converting the ammonia gas in said heated ammonia laden gas stream in a first catalytic converter to nitrogen, water vapor and approximately equal stoichiometric proportions of the remaining ammonia gas and oxides of nitrogen; and then converting the oxides of nitrogen and substantially all the remaining ammonia gas in said gas stream in a second catalytic converter to nitrogen and water vapor.

2. The method of abating ammonia gas in an ammonia laden gas stream as defined in claim 1, wherein said method includes heating said ammonia laden gas stream to a temperature of about 300° C. or greater, then converting said heated ammonia laden gas stream in said first catalytic converter having platinum as a catalytic agent.

3. The method of abating ammonia gas in an ammonia laden gas stream as defined in claim 2, wherein said method includes converting said oxides of nitrogen and substantially all of the remaining ammonia gas in said gas stream to nitrogen and water vapor in a second catalytic converter having titanium dioxide as a catalytic agent.

4. The method of abating ammonia gas in an ammonia laden gas stream as defined in claim 3, wherein said method includes diverting a portion of the heated ammonia laden gas stream following heating to said second catalytic converter having titanium dioxide as a catalytic agent.

5. The method of abating ammonia gas in an ammonia laden gas stream as defined in claim 1, wherein said method includes diverting a portion of the heated ammonia laden gas stream to said second catalytic converter to achieve substantially equal stoichiometric proportions of ammonia gas and oxides of nitrogen received by said second catalytic converter.

6. The method of abating the ammonia gas in an ammonia laden gas stream as defined in claim 1, wherein said method includes converting said ammonia gas in said heated ammonia laden gas stream in said first catalytic converter to approximately 15% or less of the ammonia gas in said heated ammonia laden gas stream and an approximately equal stoichiometric proportion of oxides of nitrogen.

7. The method of abating the ammonia gas in an ammonia laden gas stream as defined in claim 1, wherein said method includes then converting the oxides of nitrogen and substantially all of the remaining gas in said gas stream in said second catalytic converter, which is a selective catalytic reduction catalyst.

8. The method of abating the ammonia gas in an ammonia laden gas stream as defined in claim 1, wherein said method includes converting the oxides of nitrogen and substantially of the remaining ammonia gas in said gas stream received from said first catalytic converter in a selective reduction catalyst having titanium dioxide and vanadium pentoxide as catalytic agents.

9. A method of abating ammonia gas in an ammonia laden gas while minimizing oxides of nitrogen in the effluent entering the atmosphere utilizing two catalytic converters, comprising the following steps:

heating said ammonia laden gas stream to the reaction chamber of said catalytic converters;

passing the heated ammonia laden gas stream through a first catalytic converter, converting the ammonia gas in said heated ammonia laded gas stream to nitrogen, water vapor and approximately equal stoichiometric proportions of the remaining ammonia gas and oxides of nitrogen in the gas stream exiting said first catalytic converters; and then passing said gas stream exiting said first catalytic converter through a second catalytic converter, converting the oxides of nitrogen and substantially all the remaining ammonia gas in said gas stream to nitrogen and water vapor.

10. The method of abating ammonia gas in an ammonia laden gas stream as defined in claim 9, wherein said method includes diverting a portion of said heated ammonia laden gas stream following said heater to said second catalytic converter to achieve approximately equal stoichiometric proportions of the remaining ammonia gas and oxides of nitrogen exiting said first catalytic converter.

* * * * *